United States Patent [19]

Frigon et al.

[11] Patent Number: 5,551,232
[45] Date of Patent: Sep. 3, 1996

[54] WINDSHIELD WASHER CONTROL SYSTEM

[75] Inventors: Richard J. Frigon; Steven J. Stronczek, both of Michigan City, Ind.

[73] Assignee: Sprague Devices, Inc., Michigan City, Ind.

[21] Appl. No.: 347,969

[22] Filed: Dec. 1, 1994

Related U.S. Application Data

[63] Continuation-in-part of Ser. No. 201,788, Feb. 25, 1994, Pat. No. 5,427,012.

[51] Int. Cl.$^6$ ............................ F16D 31/02; B60J 1/02
[52] U.S. Cl. .................... 60/494; 91/459; 296/96.15; 15/250.001; 417/395
[58] Field of Search ................ 60/325, 494, 407, 60/408, 412; 91/459, 7; 251/360, 129.15; 296/96.11, 96.15; 15/250; 417/395

[56] References Cited

U.S. PATENT DOCUMENTS

| | | | |
|---|---|---|---|
| 2,612,141 | 9/1952 | Freedman et al. | 91/7 |
| 2,634,166 | 4/1953 | Sacchini | 417/395 X |
| 3,574,882 | 4/1971 | Petry | 15/250.02 |
| 3,659,308 | 5/1972 | Gute | 15/250.02 |
| 4,916,373 | 4/1990 | Attar et al. | 318/443 |
| 5,018,797 | 5/1991 | Takata | 251/129.15 X |
| 5,046,449 | 9/1991 | Nelson | 118/315 |

*Primary Examiner*—Hoang Nguyen
*Attorney, Agent, or Firm*—Baker & Daniels

[57] ABSTRACT

A windshield washer control system for a vehicle having an air pressure source includes an electrically actuated control valve for controlling communication between the air pressure source and a bladder pump which squirts windshield washer fluid up to the windshield of the vehicle. A fluid restricting orifice is opened and closed by a solenoid actuator such that the pressure communicated to the bladder pump is limited to be below that of the air pressure reservoir. A second orifice controls communication from the pump to ambient atmosphere.

8 Claims, 2 Drawing Sheets

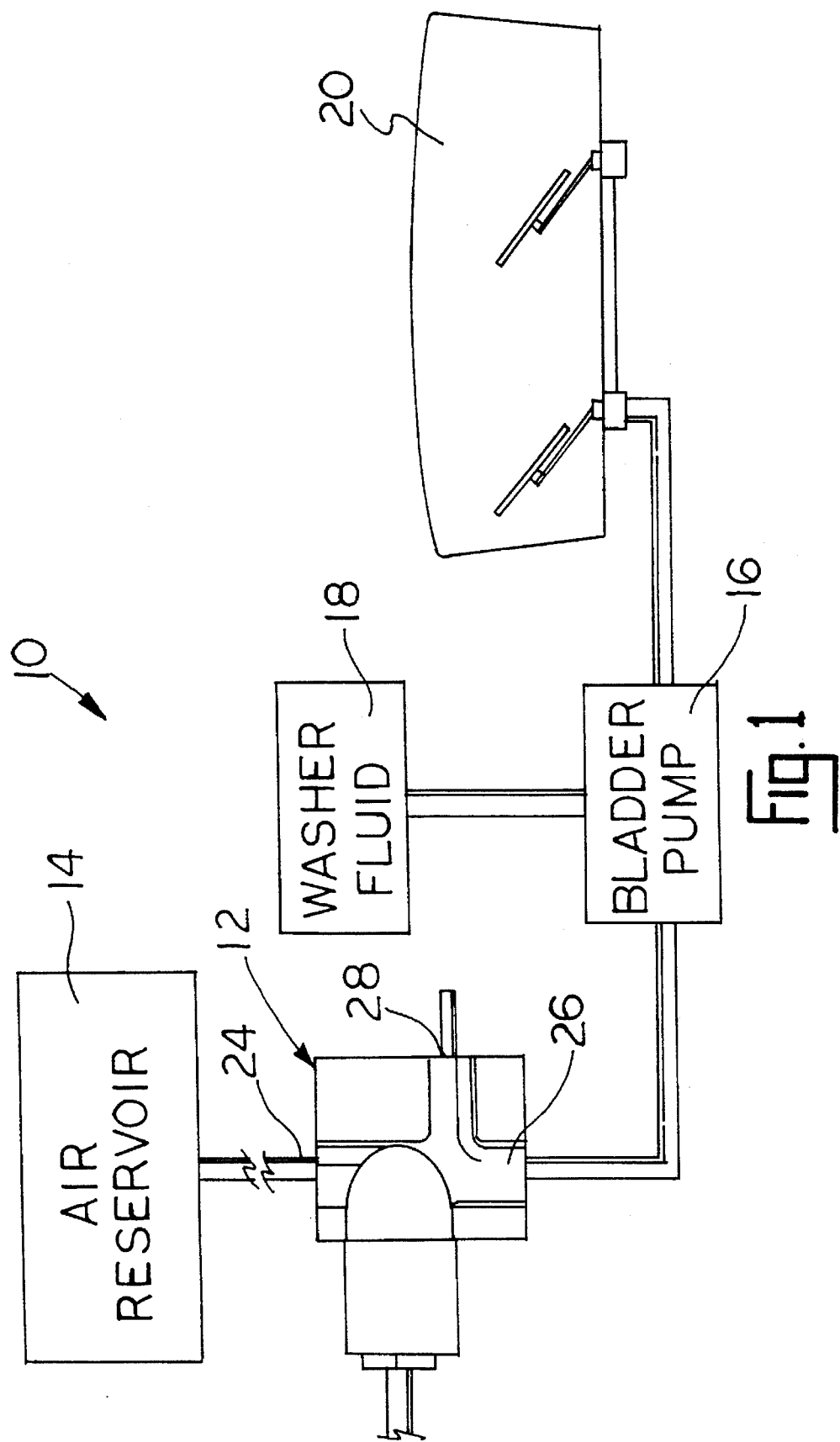

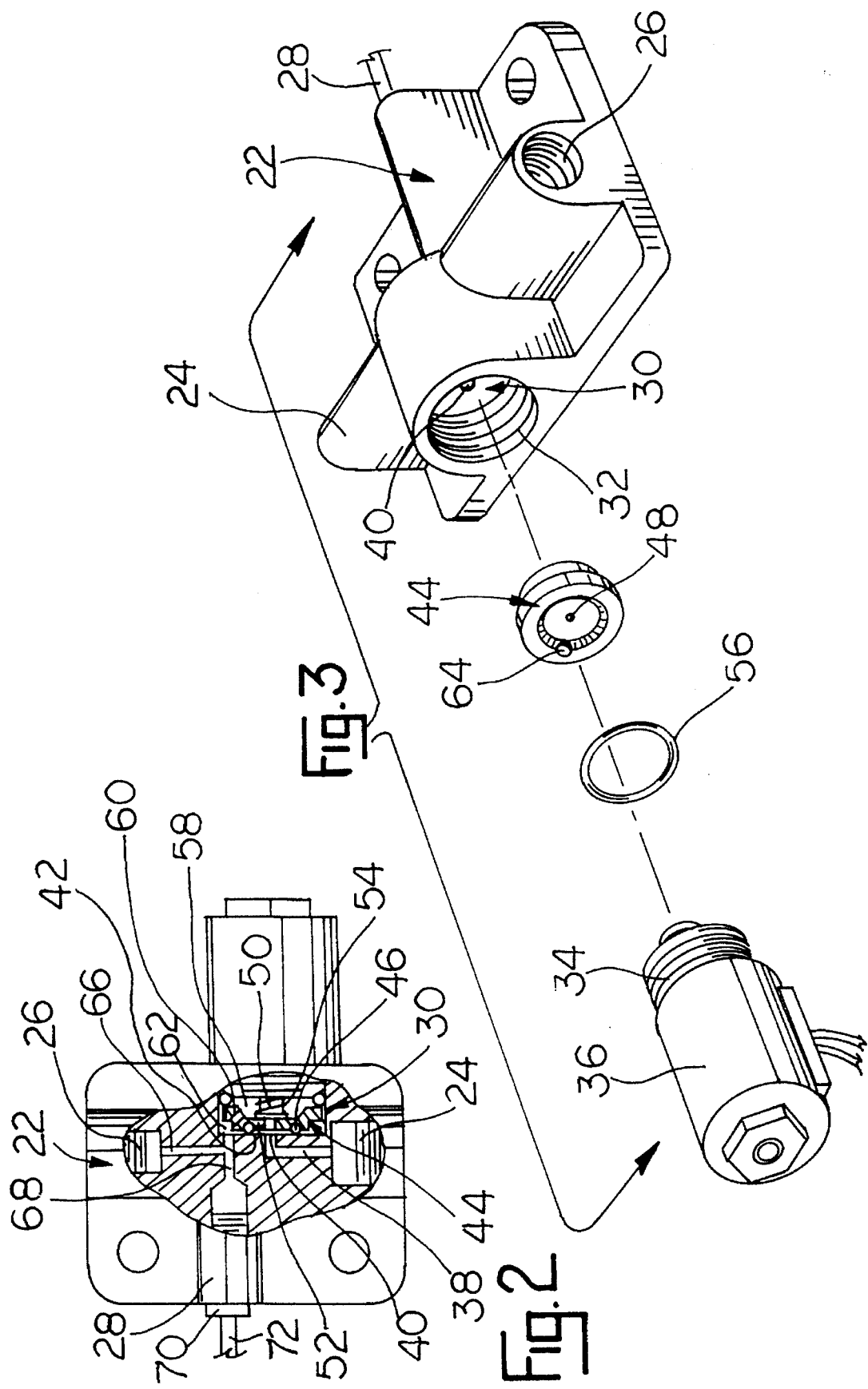

5,551,232

WINDSHIELD WASHER CONTROL SYSTEM

This is a continuation-in-part of U.S. Ser. No. 08/201,788, filed Feb. 25, 1994 now U.S. Pat. No. 5,427,012.

This invention relates to a windshield washer control system for a heavy duty vehicle.

Heavy duty vehicles, such as large trucks and buses, are equipped with an air brake system in which compressed air is used actuate the brakes of the vehicle. The air supply system is also often used to actuate the windshield wipers of the vehicle. The above identified patent application discloses a fluid motor and a control system therefore for operating the windshield wipers of a heavy duty vehicle. The vehicle air system has also been used to operate a bladder pump to spread windshield washer fluid across the windshield of the vehicle.

The present invention provides a solenoid valve which controls communication of air pressure to a bladder pump which sprays windshield washer fluid on the windshield of a heavy duty vehicle. Accordingly, the present invention controls the pressure level in the bladder pump of the windshield washer system, and eliminates air lines for control of the windshield washer system from the cab of the vehicle.

These and other advantages of the present invention will become apparent from the following description, with reference to the accompanying drawings, in which:

FIG. 1 is a schematic illustration of a windshield washer system made pursuant to the teachings of the present invention;

FIG. 2 is a top plan view of the electrically actuated control valve used in the system of FIG. 1, part of which is broken away in section; and FIG. 3 is an exploded view in perspective of the air control valve illustrated in FIG. 2.

Referring now to the drawings, the windshield washer control system generally indicated by the numeral 10 includes an electrically actuated control valve generally indicated by the numeral 12 which controls communication between an air reservoir 14, which is a part of the vehicle air brake system, and a conventional bladder pump 16. The bladder pump 16 receives windshield washer fluid from a windshield washer fluid supply 18 and sprays windshield washer fluid on the windshield 20 of the vehicle. As described in the above identified parent application, the valve 12 is actuated for a predetermined time period sufficient to operate the bladder pump 16 for one cycle to spray the windshield washer fluid on the windshield 20.

The electrically actuated valve 12 includes a housing 22 having an inlet 24 communicated with air reservoir 14, an outlet 26 communicated with the bladder pump 16, and a vent 28 that is communicated to ambient atmosphere. The housing 22 further includes a cavity 30 having a threaded wall 32 which receives threads 34 on a conventional solenoid actuator 36. A passage 38 communicates the inlet port 24 with the cavity 30 and terminates in an opening 40 on a face 42 defining the bottom of the cavity 30. An insert 44 is received within the cavity 30 before the threads 34 of the solenoid actuator 36 are installed within the threads 32 of the cavity 30. The insert 44 carries a circumferentially extending seal 46 which circumscribes the opening 40 and sealingly engages the face 42. Insert 44 further defines a flow restricting orifice 48 which communicates with the passage 38 and which restricts flow into cavity 30 to create a predetermined pressure drop across the orifice 48. The solenoid actuator 34 further includes a plunger 50 which is urged into sealing engagement with that portion of the insert 44 indicated by the numeral 52 which circumscribes the orifice 48. A spring illustrated schematically at 54 yieldably urges the plunger 50 into sealing engagement with the portion 52 when the power to the solenoid actuator is turned off. However, when the power is turned on, the plunger 50 is urged away from the orifice 48 thereby permitting communication therethrough. A seal 56 circumscribes the insert 44 and is compressed between the actuator 36 and the insert 44 to prevent leaking of air pressure out of the cavity 30.

Insert 44 includes a stepped outer periphery generally indicated by the numeral 60 which cooperates with the wall of cavity 30 to define an annular chamber 62 therebetween. Volume 58 is communicated to chamber 62 through an aperture 64 in the insert 44. A passage 66 communicates the chamber 62 with port 26. Another passage 68 communicates the annular chamber 62 with the vent port 28. An orifice insert 70 is installed in the vent port 28 which acts as a regulated air leak, and is attached to a hose 72 which communicates to the exterior of the vehicle to prevent annoying air noises.

In operation, a windshield washing cycle is initiated by the vehicle operator by operating the appropriate control knob within the vehicle operator's compartment. Accordingly, the solenoid actuator 36 is turned on for a predetermined time period governed by the electronic control unit disclosed in the above-identified parent identification. The normal air brake reservoir pressure in reservoir 14 is approximately 120 psi. The pressure drop across the orifice 48 is such that the pressure level communicated through outlet 26 to the bladder pump 16 is about 45–50 psi. This is sufficient to actuate the bladder pump 16. Pressure continues to build up in the bladder pump, but the pressure drop across the regulated air leak provided by the orifice insert 70 in the vent port 28 is sufficient to limit this pressure build up to an acceptable level. Finally, the solenoid actuator 36 is de-energized, thereby cutting off communication to the orifice 48, and permitting the residual pressure within the bladder pump 16 to vent to atmosphere through the regulated air leak 70.

I claim:

1. Windshield washer control system comprising a fluid pressure operated pump, a source of windshield wiper fluid communicated to said pump, said pump pumping windshield wiper fluid from said source in response to fluid pressure supplied to said pump and spraying said windshield wiper fluid on a vehicle windshield, and an electrically actuated control valve actuable between opened and closed conditions for controlling communication between a fluid pressure source and said pump, first constant area flow restricting means between the pressure source and said pump, and second flow restricting means between said pump and ambient atmosphere, said second flow restricting means being located between said pump and said control valve whereby said pump is communicated to the second flow restricting means regardless of the conditions of said control valve.

2. Windshield washer control as claimed in claim 1, wherein said electrically actuated valve means includes a housing, a first flow path through said housing communicating the fluid pressure source with said pump, said first flow restricting means being an orifice in said first flow path, a second flow path communicating said first flow path and ambient atmosphere, said second flow restricting means being within said second flow path.

3. Windshield washer control as claimed in claim 2, wherein said electrically actuated valve means includes a plunger cooperating with a valve seat in said first flow path to control fluid communication through said first flow path, said second flow path communicating with said first flow path between said valve seat and said pump.

4. Windshield washer control as claimed in claim 3, wherein said orifice is defined within said valve seat.

5. Windshield washer control as claimed in claim 1, wherein said electrically actuated valve means includes a housing, a first flow path through said housing communicating the fluid pressure source with said pump, said first flow restricting means being a first orifice in said first flow path, a second flow path communicating said first flow path and ambient atmosphere, said second flow restricting means being a second orifice within said second flow path.

6. Windshield washer control system comprising a fluid pressure operated pump, a source of windshield wiper fluid communicated to said pump, said pump pumping windshield wiper fluid from said source in response to fluid pressure supplied to said pump and spraying said windshield wiper fluid on a vehicle windshield, and an electrically actuated control valve for controlling communication between a fluid pressure source and said pump, first flow restricting means between the pressure source and said pump, and second flow restricting means between said pump and ambient atmosphere, said electrically actuated valve means including a housing, a first flow path through said housing communicating the fluid pressure source with said pump, said first flow restricting means being an orifice in said first flow path, a second flow path communicating said first flow path and ambient atmosphere, said second flow restricting means being within said second flow path, said electrically actuated valve means including a plunger cooperating with a valve seat in said first flow path to control fluid communication through said first flow path, said second flow path communicating with said first flow path between said valve seat and said pump, said housing including a recess defining a portion of the first flow path, said electrically actuated valve means including an electromagnetic actuator mounted in said recess controlling said plunger, said valve seat being mounted within said recess for engagement by said plunger.

7. Windshield washer control as claimed in claim 6, wherein said valve seat is carried on a valve disc within said recess for engagement by said plunger, said orifice defining said valve seat and communicating with a section of the first flow path communicating said pressure source with the orifice and an aperture communicating the orifice with a section of the first flow path communicating with the pump.

8. Windshield washer control as claimed in claim 6, wherein said second flow restricting means is an orifice in said second flow path, the pressure drop across the orifice in the second flow path being greater than the pressure drop across the orifice in the first flow path.

\* \* \* \* \*